(12) United States Patent
Snyder et al.

(10) Patent No.: US 11,565,468 B1
(45) Date of Patent: Jan. 31, 2023

(54) SYSTEM AND METHOD FOR HYBRID ADDITIVE AND SUBTRACTIVE MANUFACTURING WITH DIMENSIONAL VERIFICATION

(71) Applicant: MADE IN SPACE, INC., Moffett Field, CA (US)

(72) Inventors: Michael P. Snyder, Jacksonville, FL (US); Maxwell H. Fagin, San Jose, CA (US)

(73) Assignee: REDWIRE SPACE, INC., Jacksonville, FL (US)

( * ) Notice: Subject to any disclaimer, the term of this patent is extended or adjusted under 35 U.S.C. 154(b) by 206 days.

(21) Appl. No.: 16/214,025

(22) Filed: Dec. 7, 2018

Related U.S. Application Data

(60) Provisional application No. 62/595,979, filed on Dec. 7, 2017.

(51) Int. Cl.
| | |
|---|---|
| *B29C 64/30* | (2017.01) |
| *B29C 64/393* | (2017.01) |
| *B29C 64/35* | (2017.01) |
| *B33Y 50/02* | (2015.01) |
| *B33Y 10/00* | (2015.01) |
| *B33Y 30/00* | (2015.01) |
| *B33Y 40/00* | (2020.01) |
| *B29C 64/245* | (2017.01) |

(52) U.S. Cl.
CPC ............ *B29C 64/30* (2017.08); *B29C 64/245* (2017.08); *B29C 64/35* (2017.08); *B29C 64/393* (2017.08); *B33Y 10/00* (2014.12); *B33Y 30/00* (2014.12); *B33Y 40/00* (2014.12); *B33Y 50/02* (2014.12)

(58) Field of Classification Search
CPC ..... B29C 64/30; B29C 64/245; B29C 64/393; B29C 64/35; B33Y 50/02; B33Y 30/00; B33Y 10/00; B33Y 40/00; G05B 19/4099; G05B 2219/35134; G05B 2219/49007; G05B 2219/32228
See application file for complete search history.

(56) References Cited

U.S. PATENT DOCUMENTS

| | | | |
|---|---|---|---|
| 2006/0156978 A1* | 7/2006 | Lipson | B29C 64/118 118/708 |
| 2009/0177309 A1* | 7/2009 | Kozlak | B29C 64/321 700/119 |
| 2015/0140147 A1* | 5/2015 | Konstantinos | B29C 64/241 425/131.1 |

(Continued)

*Primary Examiner* — Niki Bakhtiari
*Assistant Examiner* — Inja Song
(74) *Attorney, Agent, or Firm* — Terry M. Sanks, Esq.; Beusse Sanks, PLLC

(57) ABSTRACT

A system, is disclosed having a polymer-based additive manufacturing subsystem, a metallic-based additive manufacturing subsystem, an exchanger to place at least one of the polymer-based additive manufacturing subsystem and the metallic-based additive manufacturing subsystem into a position to provide a manufacturing process, a build area where a part is created with the polymer-based additive manufacturing subsystem and the metallic-based additive manufacturing subsystem, and an environmental control unit to collect debris produced during operation of the polymer-based additive manufacturing subsystem and the metallic-based additive manufacturing subsystem. Another system and method are also disclosed.

19 Claims, 19 Drawing Sheets

(56) References Cited

U.S. PATENT DOCUMENTS

| | | | |
|---|---|---|---|
| 2016/0243759 A1* | 8/2016 | Snyder | B29C 70/68 |
| 2017/0106594 A1* | 4/2017 | Gardiner | B29C 64/135 |
| 2017/0151713 A1* | 6/2017 | Steele | B33Y 30/00 |
| 2017/0292922 A1* | 10/2017 | Woods | B22F 3/1055 |
| 2018/0345585 A1* | 12/2018 | Ederer | B29C 64/245 |
| 2019/0105833 A1* | 4/2019 | Cambron | B29C 64/241 |
| 2019/0262986 A1* | 8/2019 | Newell | B29C 64/106 |
| 2019/0299523 A1* | 10/2019 | Wu | B29C 64/118 |
| 2020/0329814 A1* | 10/2020 | Wang | B29C 64/245 |

* cited by examiner

SYSTEM AND METHOD FOR HYBRID ADDITIVE AND SUBTRACTIVE MANUFACTURING WITH DIMENSIONAL VERIFICATION

CROSS-REFERENCE TO RELATED APPLICATIONS

This application claims the benefit of U.S. Provisional Application No. 62/595,979, filed Dec. 7, 2017, and incorporated herein by reference in its entirety.

BACKGROUND

Embodiments relate to manufacturing a component with both additive manufacturing and subtractive manufacturing and, more particularly, to a system and method to manufacture within an enclosure where a part is created with both additive manufacturing and subtractive manufacturing where build tolerances for the part are measured during and post processing.

A type of manufacturing that is growing in use and popularity is additive manufacturing. An existing type of manufacturing is subtractive manufacturing or where segments or chunks are moved from an initial bulk material to create a final part.

Limitations of additive manufacturing resolution have been known for decades. Others have attempted to address this in fused deposition modeling ("FDM") type processes by reducing a size of the nozzle opening, thereby shrinking the size of extruded material. This have been found to reduce layer heights and extrusion widths at the expense of increasing the time required to complete deposition. A further downside is an increase in a likelihood of encountering errors in printing such as clogging or skipping of extruder motor steps. As a result, post processing is likely necessary to finish a manufactured part. In such cases separate steps, utilizing different machines are employed for deposition, finishing and dimensional verification of parts.

Furthermore, conventional wisdom in additive manufacturing dictates that to increase resolution, a decrease in a cross-sectional area of deposited traces is required. This may result in significant problems in FDM processes including greatly increasing time to manufacture, and likelihood of errors occurring during the process. When printing metals, conventional wisdom follows a similar approach by seeking out high precision deposition techniques which utilize focused laser or electron beam energy sources to melt metal powders into small traces.

Also, conventional wisdom suggests that the use of large machines operated by skilled technicians that are dedicated to a single function is often best.

Manufacturing in reduced gravity or fluctuating gravity environments can be challenging. Additive manufacturing is a type of manufacturing that has been demonstrated by the Assign that works in a micro-gravity environment.

Manufacturers would benefit from a system and method where a single machine may be used to provide acceptable specification tolerances of a part that is manufactured. This would be particularly beneficial where a manufacturing area is limited, such as on a space station, in outer space or on a celestial body.

SUMMARY

Embodiments relate to a system and method to enable additive manufacturing deposition and subtractive manufacturing processing where build tolerances are measured during and post processing. The system comprises a polymer-based additive manufacturing subsystem and a metallic-based additive manufacturing subsystem. The system also comprises an exchanger to place at least one of the polymer-based additive manufacturing subsystem and the metallic-based additive manufacturing subsystem into a position to provide a manufacturing process. The system further comprises a build area where a part is created with the polymer-based additive manufacturing subsystem and the metallic-based additive manufacturing subsystem. The system also comprises an environmental control unit to collect debris produced during operation of the polymer-based additive manufacturing subsystem and the metallic-based additive manufacturing subsystem.

In another embodiment, the system comprises an additive manufacturing subsystem to provide for deposition of at least one of a polymer material and a metallic material during creation of a part. This system also comprises a subtractive manufacturing subsystem to remove at least one of a piece from the part being created and a piece from a block of material to create the part. The system further comprises an exchanger to locate at least one of a deposition head specific to at least one of an additive manufacturing process being performed by the additive manufacturing subsystem and a tool used to remove the at least one of the piece from the part being created and from the block from which the part is created and a build area where the part is created. The system also comprises a part verification subsystem to assist to determine whether the part adheres to a specification requirement for the part.

The method comprises determining a part to be created with a part creation file provided to a computing device and controlling an environment at a location where the part is to be created with an environmental control system. The method further comprises determining whether to apply at least one of an additive manufacturing process with an additive manufacturing subsystem and to remove a piece from at least one of the part and a block of material used to create the part with a subtractive manufacturing subsystem and applying the process determined. The method also comprises switching between at least one of a deposition head specific to the at least one of an additive manufacturing process when performed by the additive manufacturing subsystem and a tool when the subtractive manufacturing process is performed by the subtractive manufacturing subsystem. The method also comprises determining whether the part adheres to a specification requirement for the part with a part verification subsystem.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

DETAILED DESCRIPTION

Figure 1:
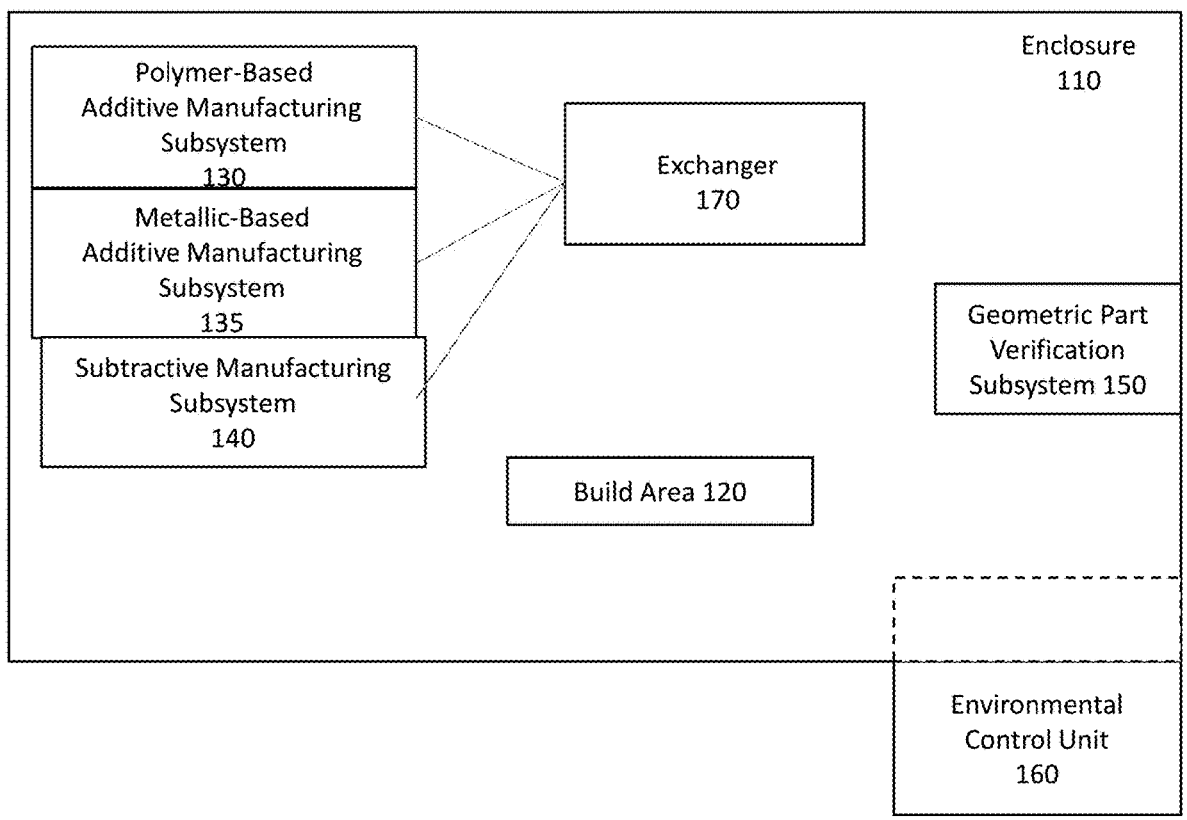
FIG. 1 shows a block diagram of an embodiment of components of a hybrid additive and subtractive manufacturing system.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Embodiments disclosed herein provide for an additive and subtractive metal and plastic manufacturing system incorporating metal deposition, thermoplastic deposition, computer numeric control (CNC) machining capabilities, environmental control, and part geometry verification. The embodiments may perform any one of ready to use print depositions, prints that are machined entirely post deposition, prints with deposition and machining iterations, and stand-alone machining operations. As is further disclosed herein, debris present from manufacturing operations may be captured in an environmental control unit designed to trap particulates produced within the build volume. The debris may be contained for safe system operation, such as, but not limited to an environmental control system and method disclosed in U.S. Provisional Patent Application No. 62/591,240 or U.S. patent application Ser. No. 16/202,606, incorporated herein by reference.

Once or during part construction or manufacturing, a geometric part verification system may confirm part geometry. In another embodiment the geometric part verification system may determine a defect in the part and build a corrective manufacturing action to amend errors. The embodiments shown herein may be scalable and adaptable. Also, as discussed later herein, the term geometric is not included to be limiting as verification beyond geometrics of a part may be performed.

FIG. 1 shows a block diagram of an embodiment of the system described above. The system 100 may include an enclosure 110. Within the enclosure is a build area 120. A polymer-based additive manufacturing subsystem 130 and a metallic-based additive manufacturing subsystem 135 are also disclosed. A subtractive manufacturing subsystem 140 is also shown. A geometric part verification subsystem 150 is provided included. Though the term "geometric" is included, as disclosed herein, this term is not meant to be limiting since the part verification subsystem 150 can verify other characteristics besides geometric features, such as, but not limited to material composition, internal part structure, etc.

An environmental control unit 160 is also shown. An exchanger 170 is shown which may switch between whether polymer-based additive manufacturing processing or metallic-based additive manufacturing processing is being performed. The switch may be exchanging deposition heads. Furthermore, the switch may include placement of a tool for use with a subtractive manufacturing process.

Figure 2:
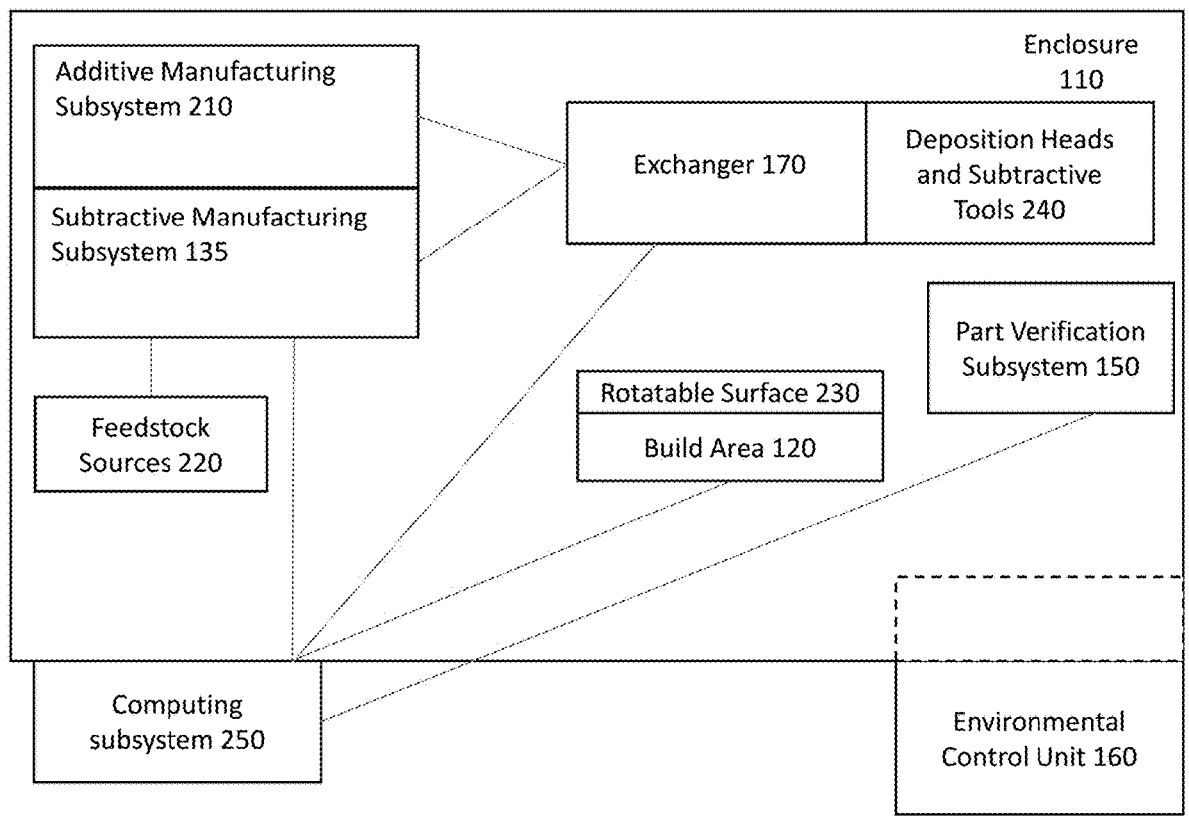
FIG. 2 shows another block diagram of the system.

FIG. 2 shows another block diagram of an embodiment of the system. An additive manufacturing subsystem 210 is shown. The additive manufacturing subsystem 210 may comprise both the polymer-based additive manufacturing subsystem 130 and metallic-based additive manufacturing subsystem 135 discussed herein. Feedstock sources 220, such as, but not limited to, a plurality of bins may also be provided which may be used to store the feedstock specific for use by either the polymer-based additive manufacturing subsystem 130 or the metallic-based additive manufacturing subsystem 135. Also shown is a rotatable surface 230. Also shown is a holder 240 to locate deposition heads and/or subtractive tools prior to use. As explained later herein, a computing device, or subsystem, 250 is shown.

Figure 3:
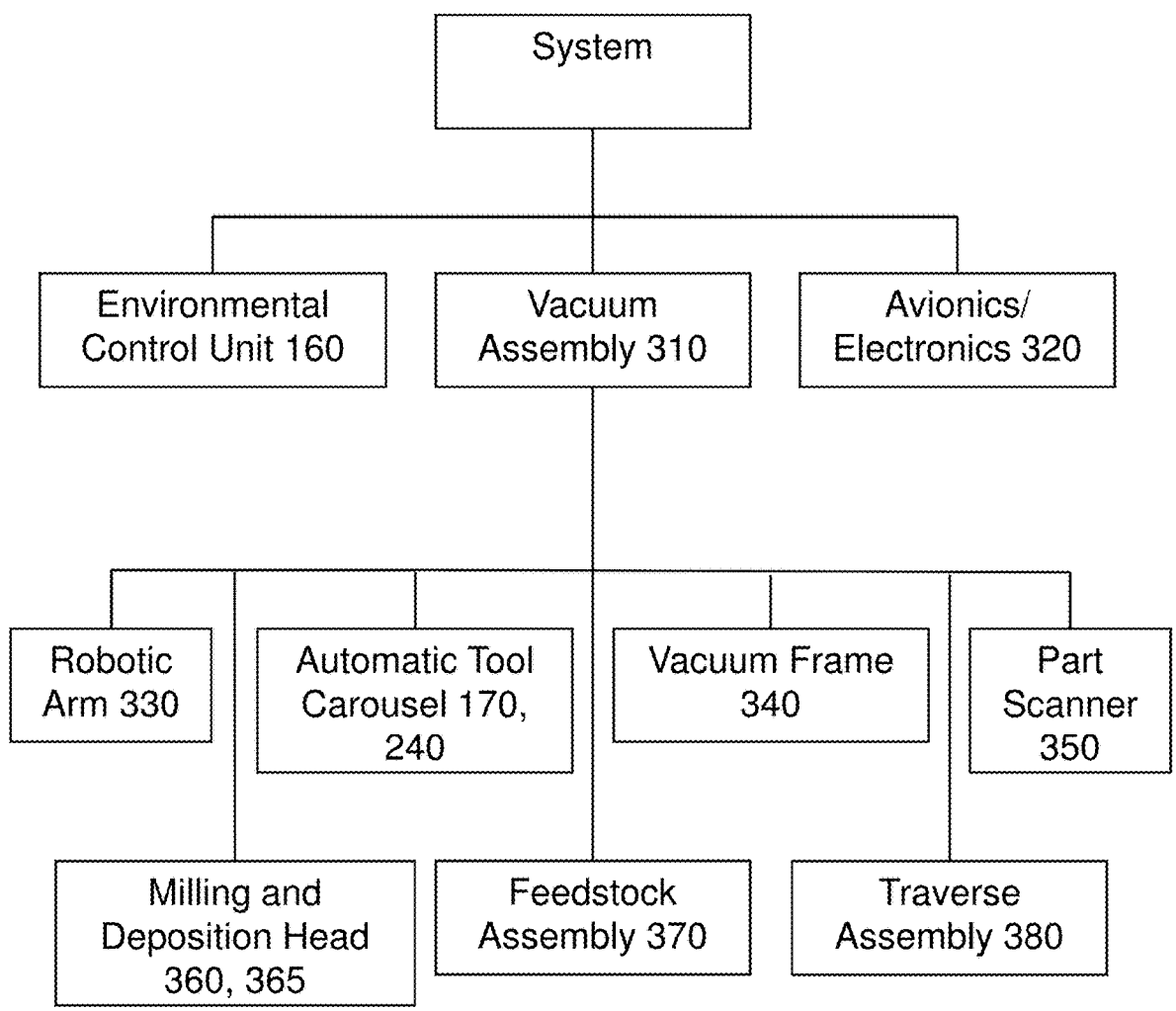
FIG. 3 shows another block diagram of the system.

FIG. 3 shows a block diagram of an embodiment of components of a hybrid additive and subtractive manufacturing system. As shown, the system 100 may comprises the environmental control unit 160, such as, but not limited to, a unit as disclosed above and incorporated herein by reference. A vacuum assembly 310 may also be provided to remove debris or particulates or particles resulting from a manufacturing process. Avionics/electronic components 320 may be provided to further operate the system 100. The avionics/electronic components 320 may also comprise the computing device 250 disclosed herein. The system 100 may further comprises a robotic arm 330 to at least engage a part being made. The tool carousel 240, which may be automatic, as controlled by the computing device, may be provided to house or hold and exchange deposition heads. In another embodiment, the exchanger 170 is provided to exchange deposition heads or tools. A vacuum frame 340 may also be provided. The geometric part verification subsystem 150 may comprises a scanner 350 which may be provided to capture images of a physical object for use in determining whether the part adheres to a desired specification. The desired specification may be a geometric specification or requirement or manufacturing component consistency of the part.

The scanner 350, or imager, or imaging scanner, may perform this function during manufacturing or once manufacturing is complete. In an embodiment, images may be captured as the rotary bed or surface 230 moves or rotates so that all angles or sides of the part may be captured to ensure a precise adherence to the desired specification. Therefore, though the term rotatable surface is used herein, this surface may move in transverse direction, circular direction, elliptical direction, etc. The movement is not limited to a particular pattern. The scanner 350 may image an outside surface of the part or may also operate at a wavelength, such as, but not limited to a wavelength used for x-ray scans, to image an inside surface or content of the part.

Milling tools 360 and deposition tools 265, or heads are disclosed. The at least one milling tool 360 may be provided to remove a piece from the part, during an subtractive manufacturing process. A feedstock assembly 370 is provided supply deposition feedstock. The feedstock is specific to the type of additive manufacturing process being performed, such as, but not limited to polymer-based additive manufacturing and metallic-based additive manufacturing. The feedstock assembly 370 may be able to switch between the types of feedstock required based on the additive manufacturing process or multiple feedstock assemblies 370 are provided specific to each type of additive manufacturing process. The exchanger 170 is provided to place to move the deposition heads to desired locations. The exchanger 170 may be a traverse assembly 380. The traverse assembly 380 may also be used to rotate the rotary or traverse the rotatable surface or bed 230.

Figure 4:
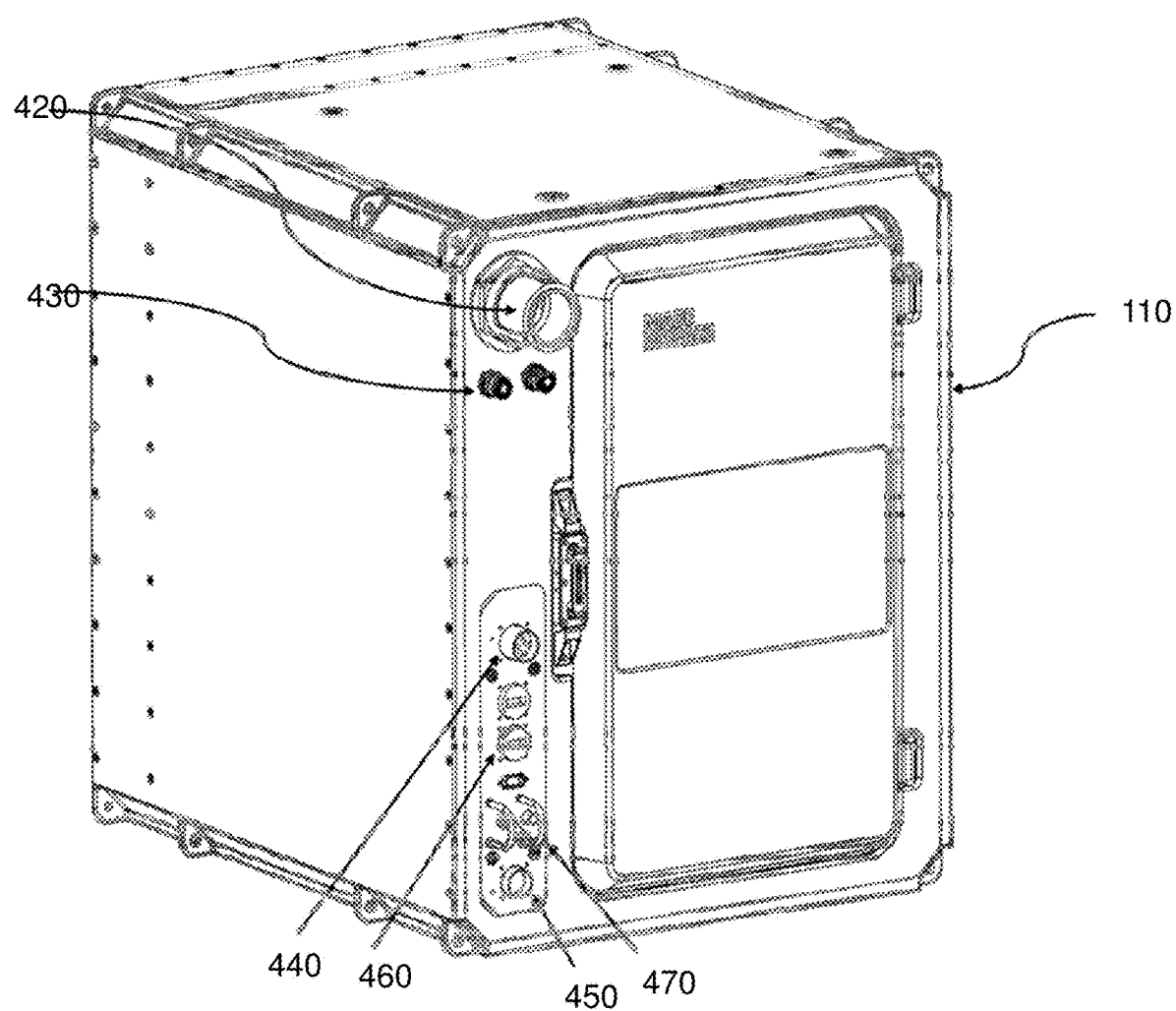
FIG. 4 shows an embodiment of the system as an operational unit.

FIGS. 4-12 show embodiments of various aspects of the system. FIG. 4 shows an embodiment of the system 100 as an operational unit. As shown, the enclosure 110 is provided. The enclosure 110 may comprises a door 410, which is shown as closed. During operation of the system 100, the door 410 is likely to be closed. An exhaust port 420 may be provided to connect to the environmental control unit 160. The environmental control unit 160 may comprise the vacuum assembly 310, including the vacuum frame 340. The vacuum assembly 310 may be within the enclosure or outside the enclosure 110. Water lines 430 may be provided to supply and remove water from within the enclosure 110.

A second port 440 may be provided to provide power to the system 100. The power may be a plurality of different power sources to produce different types of power, such as, but not limited to, direct current, alternating current, beamed power, or from an energy storage system such as a fuel cell or battery. The type of power may be specific to the type of additive manufacturing or subtractive manufacturing is being performed. As a non-limiting example, during a metallic-based additive manufacturing process a laser may be used which may require a more powerful power source than when applying the a polymer-based additive manufacturing process.

Figure 21:
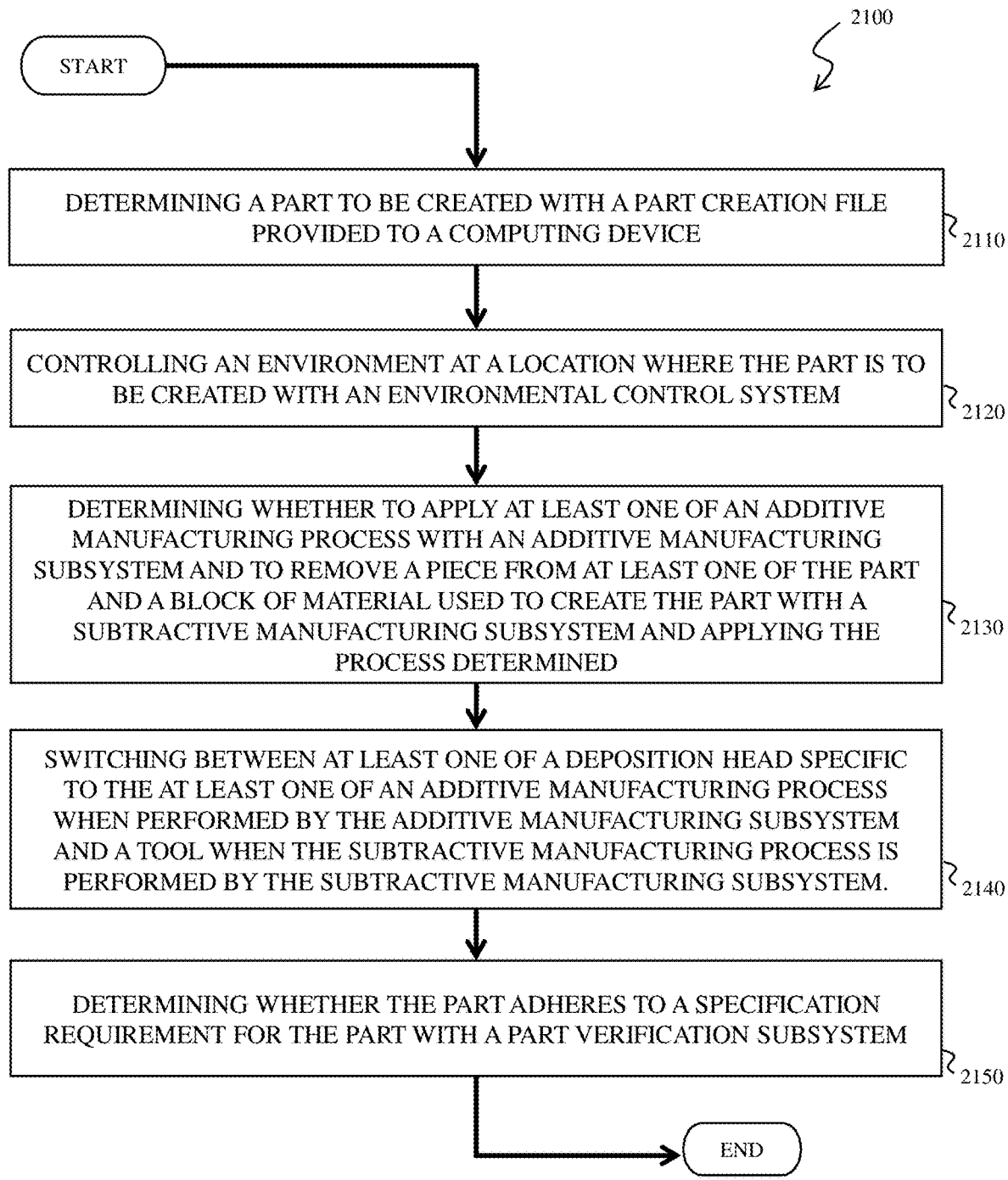
FIG. 21 shows another flowchart of an embodiment of a method.

At least one data port 450 may be provided to attach an electronic storage device, not shown but may be part of the computing device 250 shown in FIG. 21. Another type of data port 460 may also be provided, such as, but not limited to a USB port. An electric breaker 470 may also be provided. The manufacturing atmosphere within the enclosure 110 may be composed of ambient constituents, such as, but not limited to inert gasses, or even a vacuum.

Figure 5:
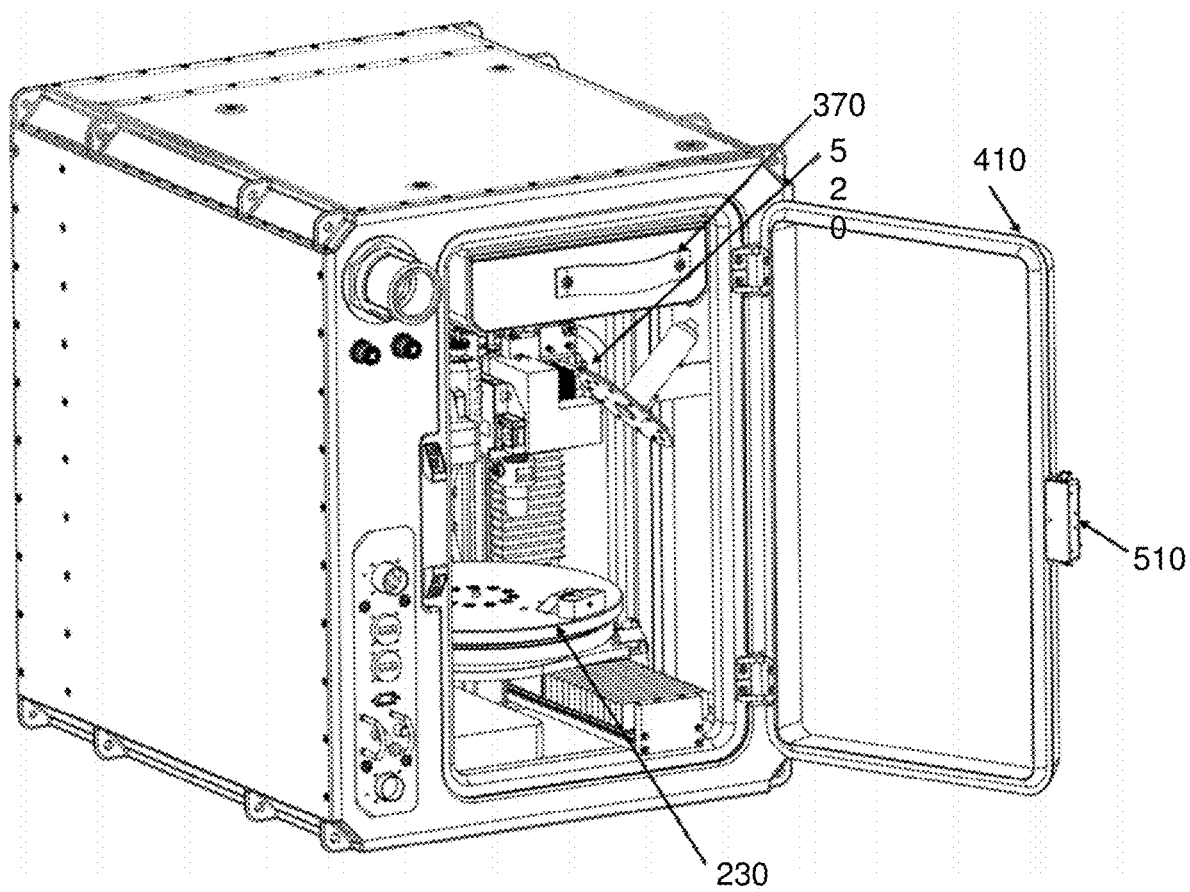
FIG. 5 shows an embodiment of the system with the door open.

FIG. 5 shows an embodiment of the system with the door open. Viewing within the opening that is covered by the door 410 is a rotary bed on which the part is created. The door 410 may have a latch 510 to secure the door 410 in place when the door is in a closed position. The build area 120, or bed, may be rotated as needed for part creation. As discussed above, the build area 120 may be moved any direction, in addition to being rotated. A traverse mechanism 520 is shown. The traverse mechanism 520 may be provided to locate the deposition heads and/or rotate the rotary bed 230 as needed during part creation. A feedstock canister, or assembly 370, to hold feedstock prior to deposition, is also shown.

Figure 6:
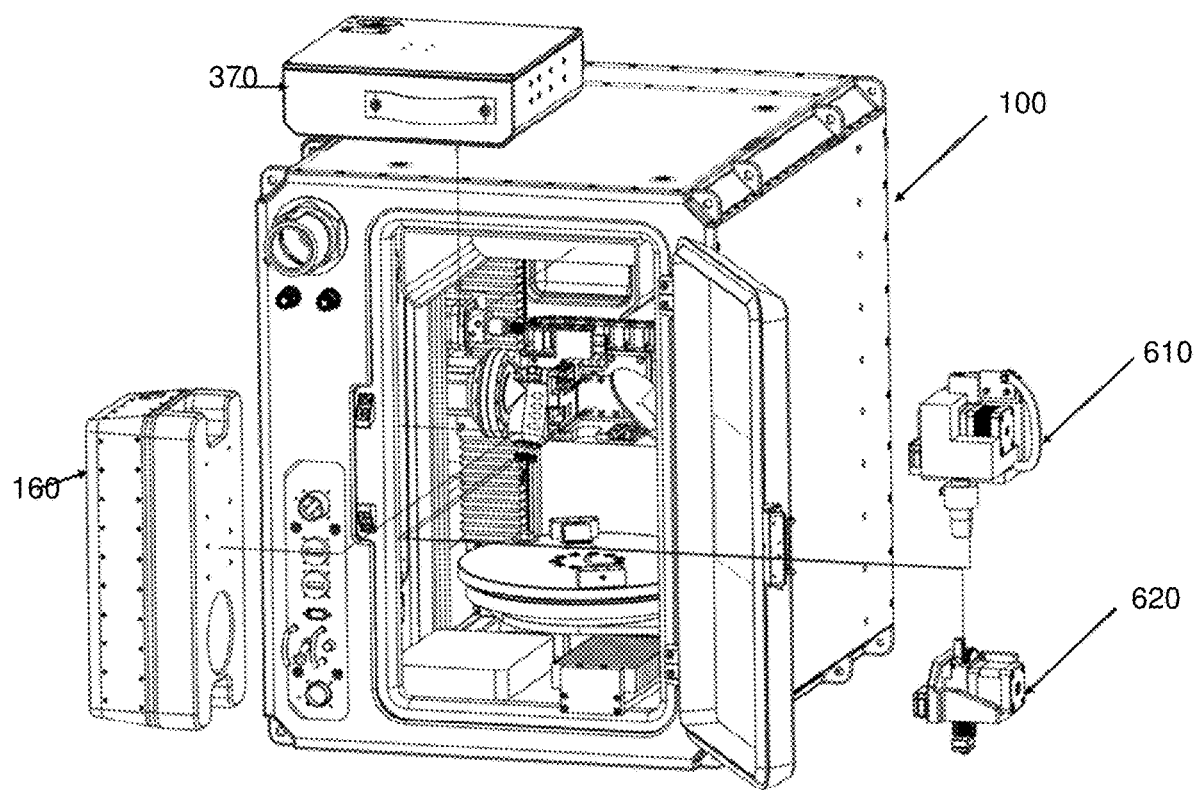
FIG. 6 shows an embodiment of the system with serviceable parts removed.

FIG. 6 shows an embodiment of the system with serviceable parts removed. As shown, the environmental control unit is removable. The feedstock canister 370 may also be removed. A metal deposition head 610 and a polymer deposition head 620 are shown and may also be removed.

Figure 7:
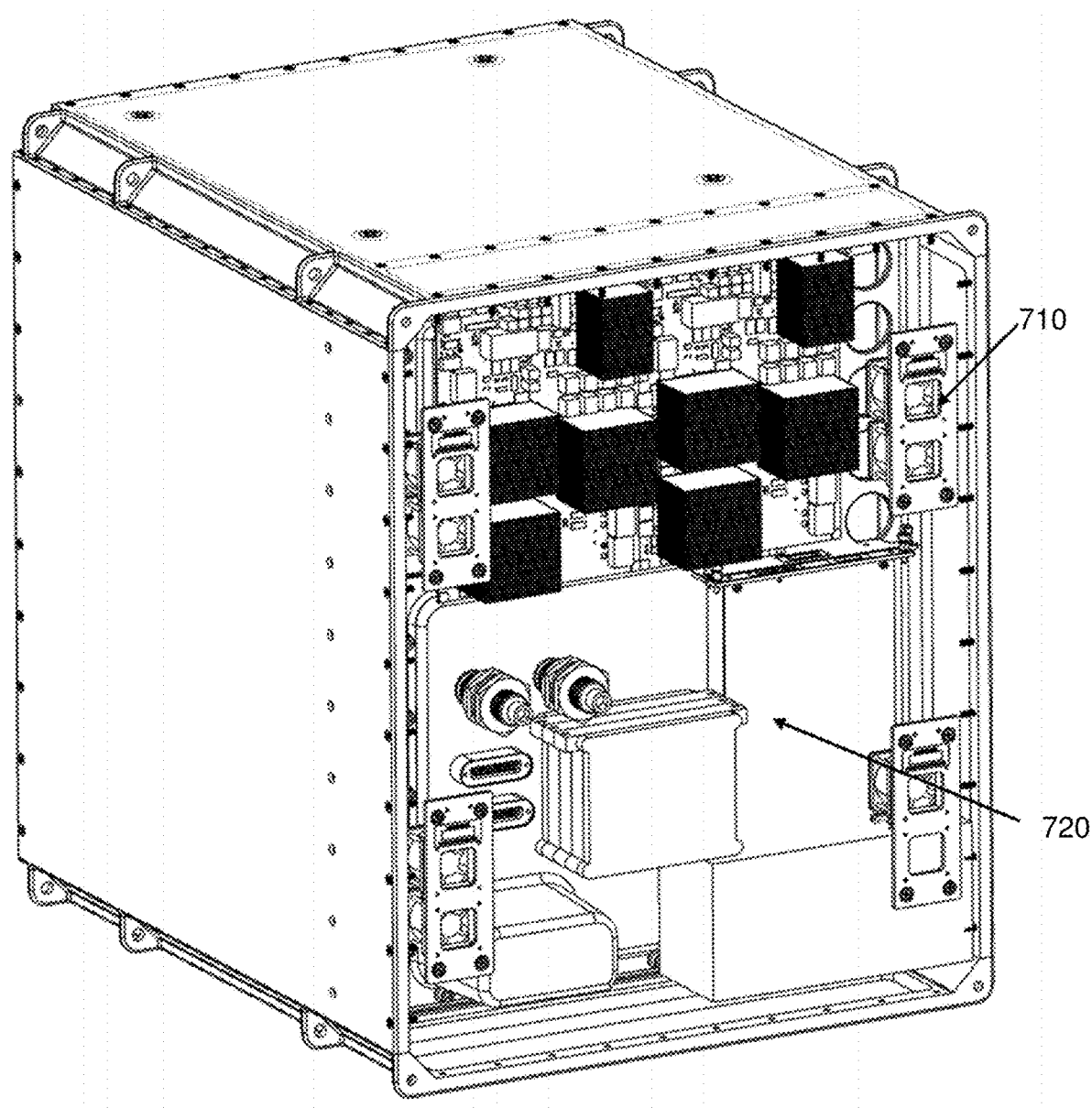
FIG. 7 shows an embodiment of a backside of the system.

FIG. 7 shows an embodiment of a backside of the system. As shown, at least one gas port 710 may be provided to supply a gas, such as air to the system 100. An electronic bay 720 is also disclosed. The electronic bay 720 may house the computing device 250 disclosed herein.

Figure 8:
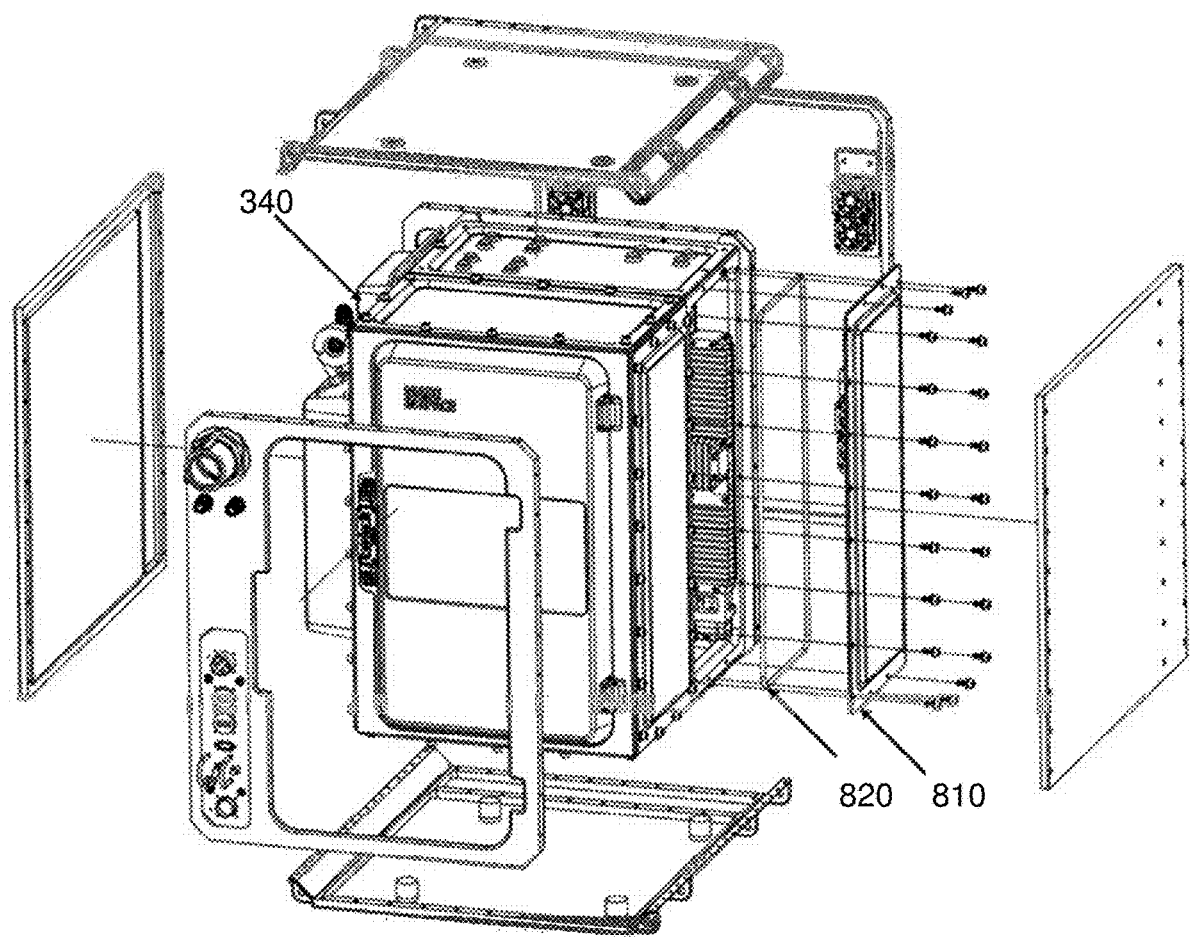
FIG. 8 shows an embodiment of the system with outer walls removed.

FIG. 8 shows an embodiment of the system with outer walls of the enclosure removed. As shown, the vacuum frame 340 is provided. A modular panel 810 is shown. A sealing O-ring 820 is shown to provide a seal for the modular panel 810 when attached within the enclosure 110 to provide for a sealed interior.

Figure 9:
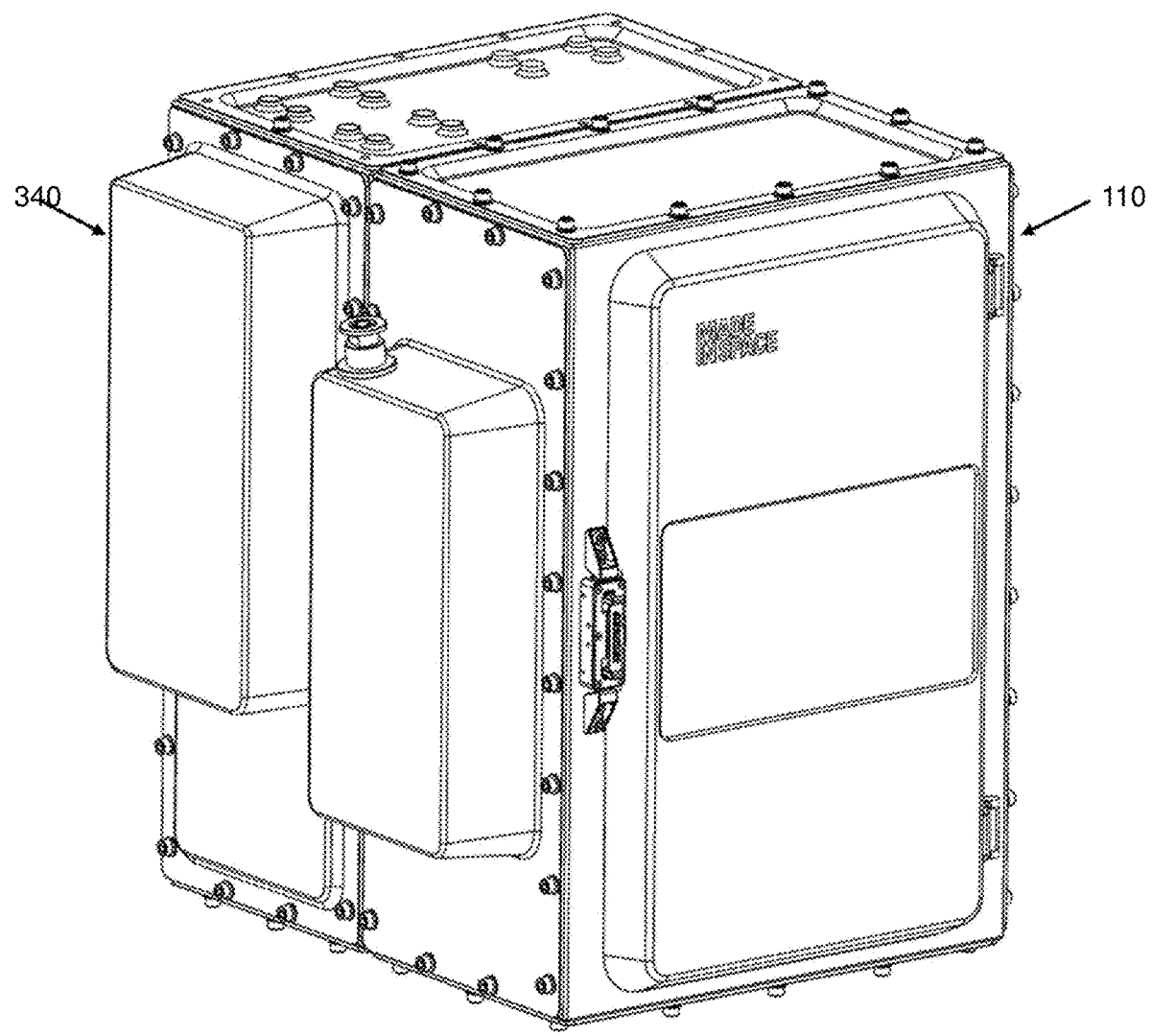
FIG. 9 shows an embodiment of the system fully enclosed. A vacuum panel is shown.

FIG. 9 shows an embodiment of the system fully enclosed. A vacuum panel 910 is shown within which the vacuum frame 340 may be located.

Figure 10:
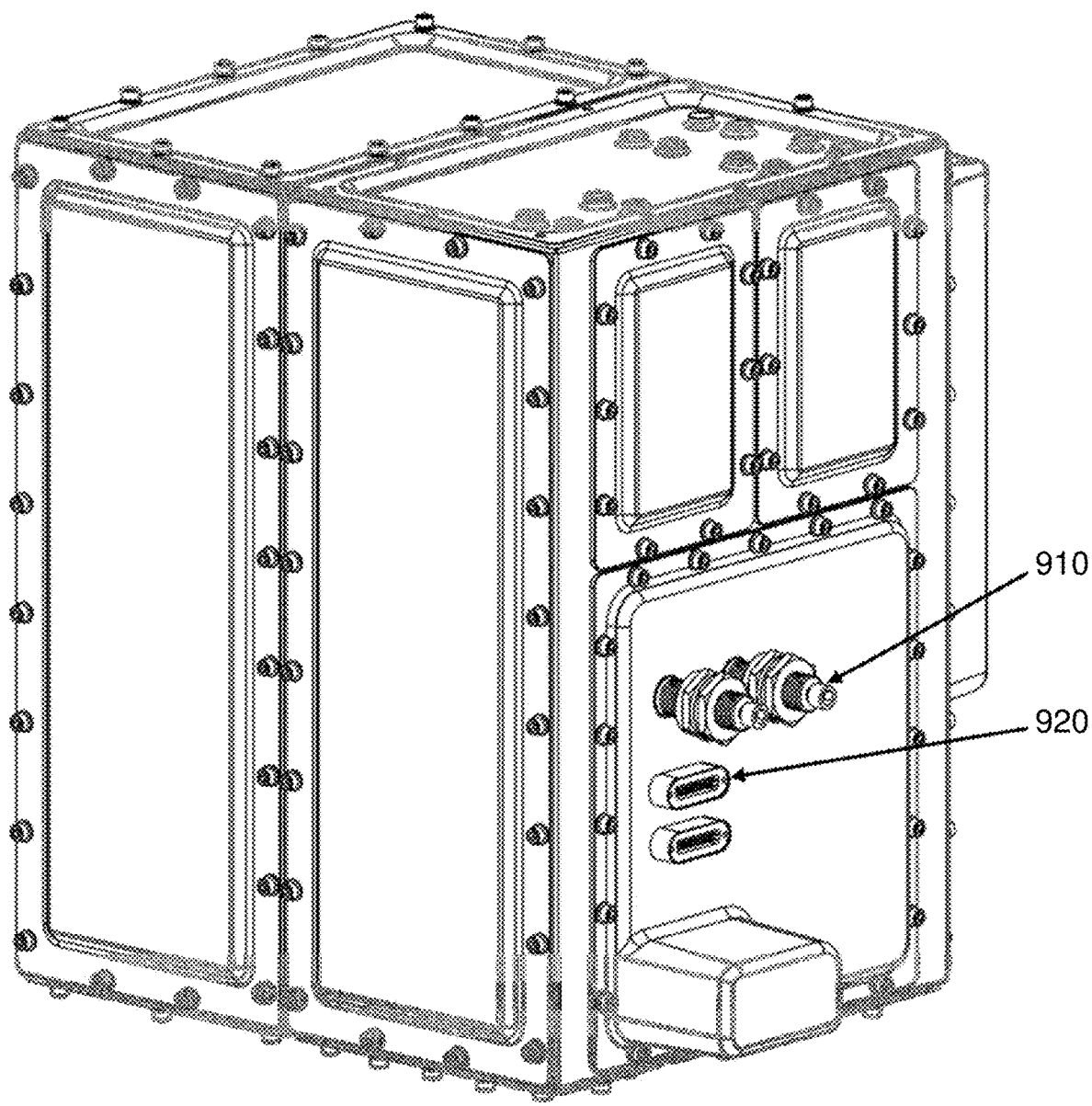
FIG. 10 shows an embodiment of another view of the system fully enclosed.

FIG. 10 shows an embodiment of another view of the system fully with the outer walls removed. Power feedthroughs 910 are shown along with instrumentation feedthroughs 920.

Figure 11:
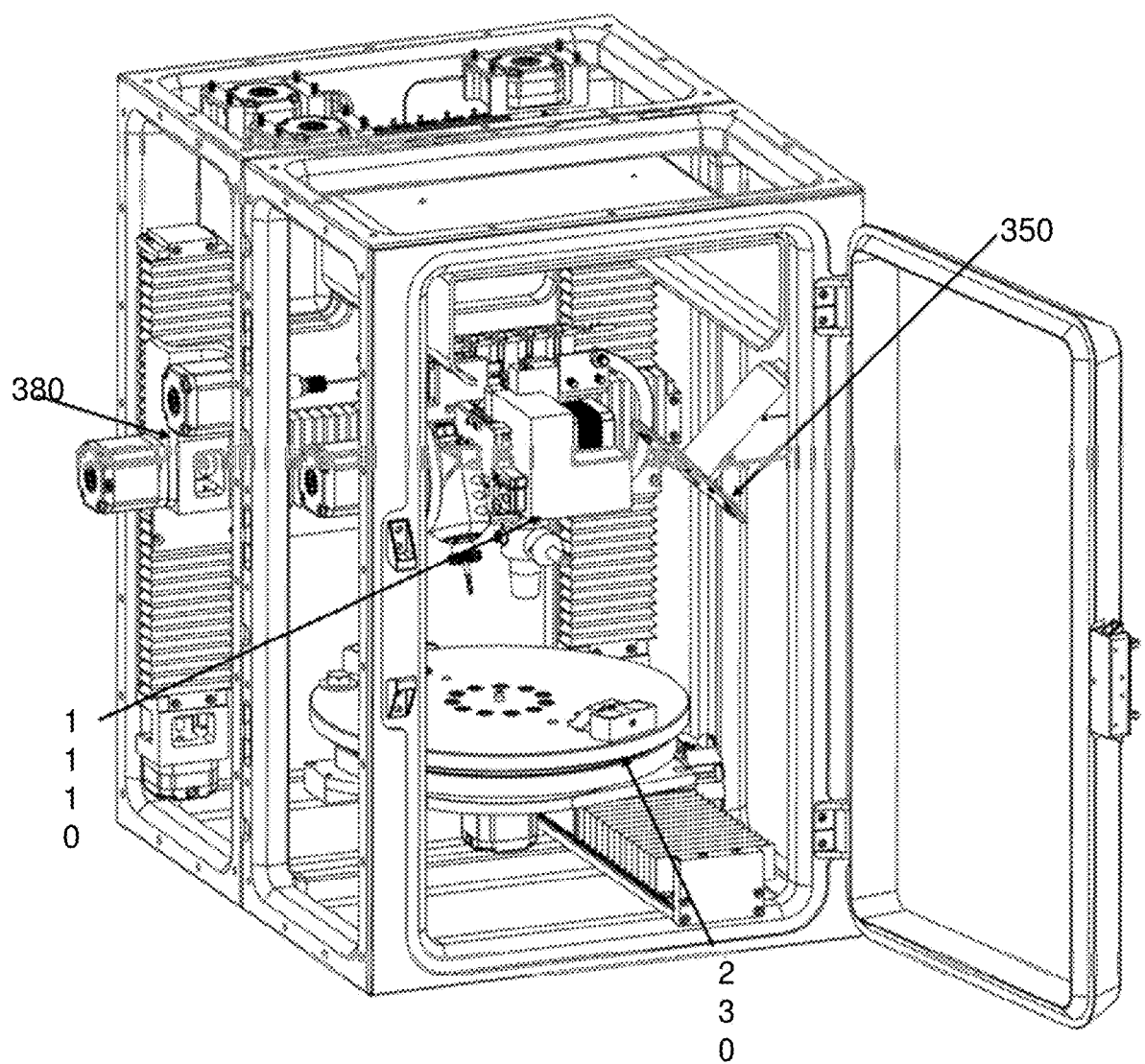
FIG. 11 shows an embodiment of the system with the sides removed.

FIG. 11 shows an embodiment of the system with the sides removed. As shown, a part scanner 350 is shown. Also shown is the traverse system 380 and the rotary bed 230. A milling and deposition assembly 1110 are also disclosed. This assembly 1110 may be what holds the deposition heads or tools based on the type of manufacturing process being used.

Figure 12:
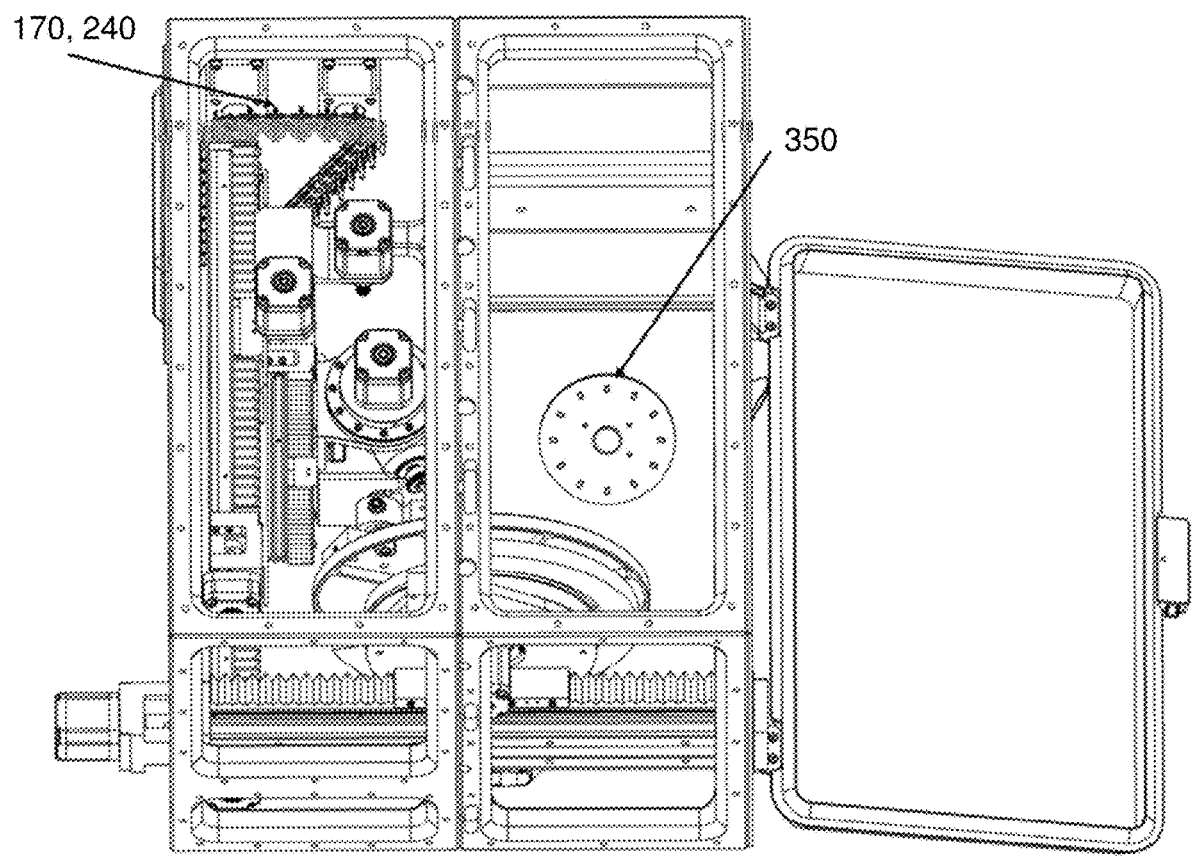
FIG. 12 shows an embodiment of a side view of the system with the sides removed.

FIG. 12 shows an embodiment of a side view of the system with the sides removed. As shown the scanner is visible along with the tool carousel 170, 240.

Figure 13:
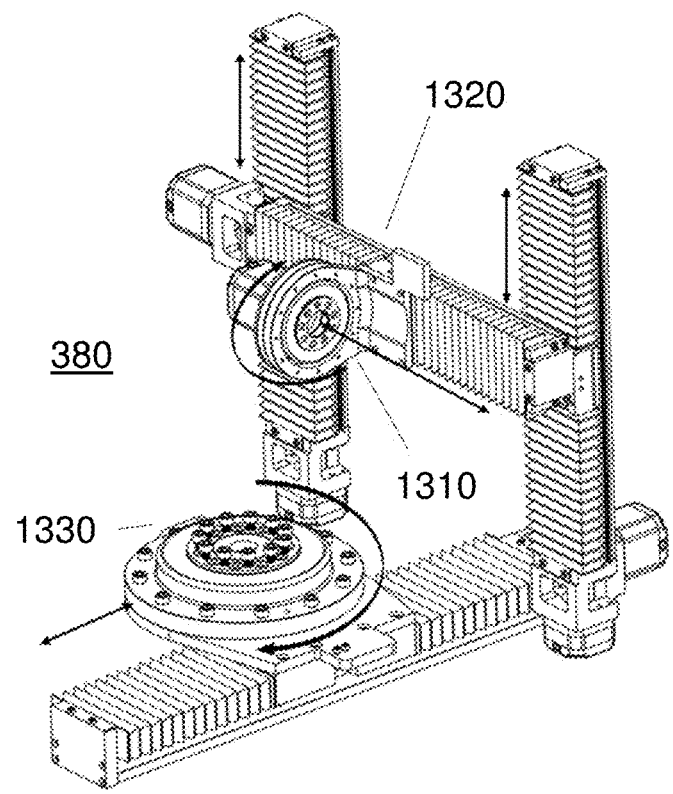
FIG. 13 shows an embodiment of the traverse system removed from the system.

FIG. 13 shows an embodiment of the traverse system removed from the system. As shown, a first attachment component 1310 is arranged to move left to right. A horizontal traverse bracket 1320 is arranged to move up and down or vertically. The first attachment 1310 is attached to the horizontal traverse bracket 1320. Another, or second attachment component 1330, to which the rotary table 230 may be attached is also provided. The traverse system 380 may also be arranged to move the rotary table 230 front and back (forward and backward) in addition to circular about a center radius of the table 230.

Figure 14:
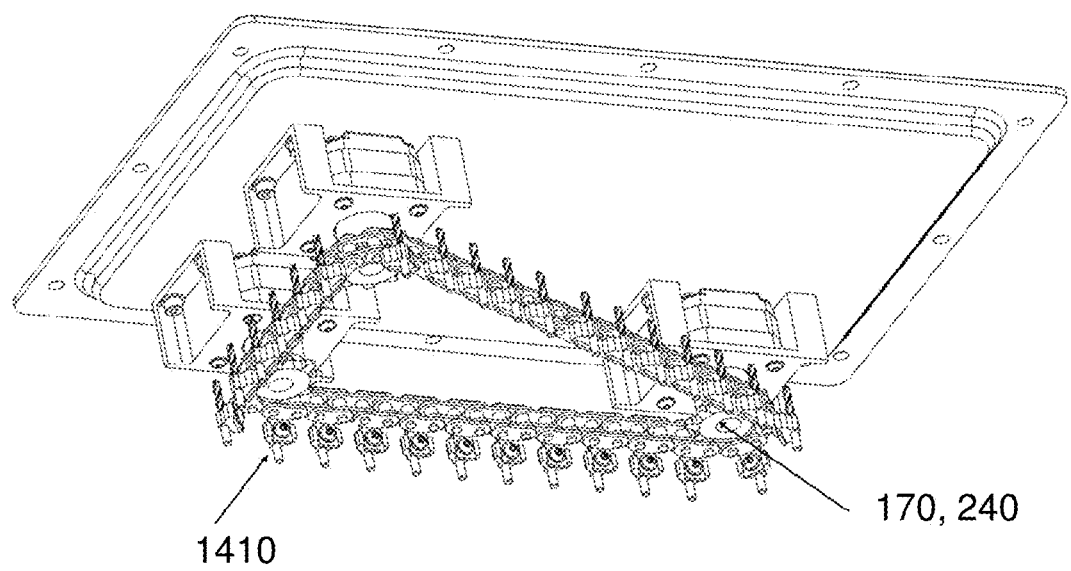
FIG. 14 shows an embodiment of the tool carousel.

FIG. 14 shows an embodiment of the tool carousel. The tool carousel 170, 240 may have attachments to hold at least one computer numerical control ("CNC") tool 1410 which may include at least one of metal deposition head 610, polymer deposition head 620, a welding head, a milling device, etc.

Figure 15:
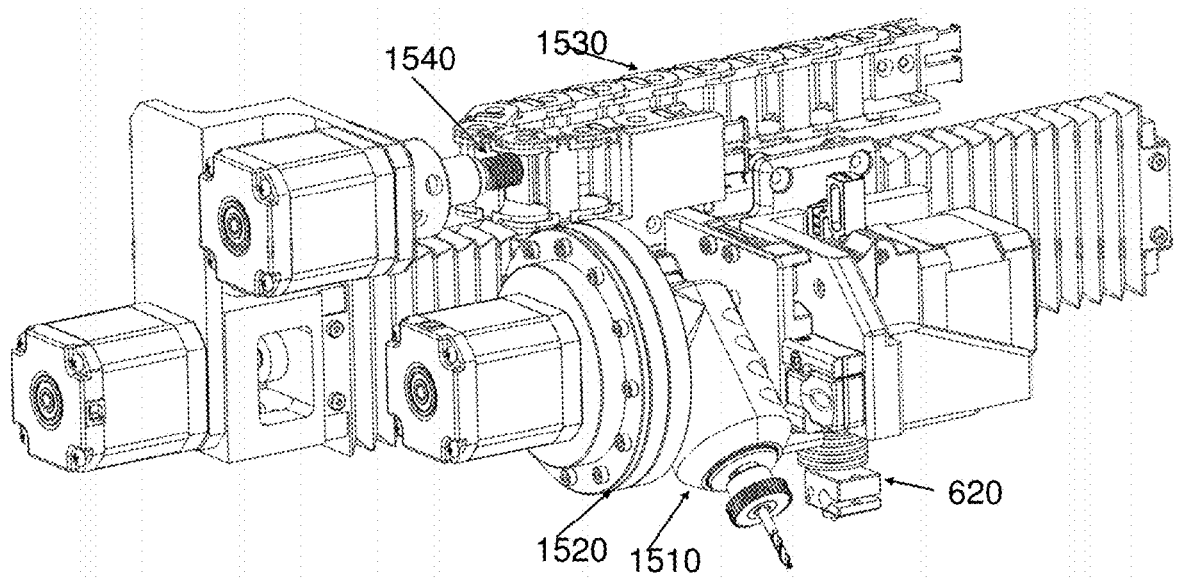
FIG. 15 the head assembly is attached to a horizontal part of the traverse system.
Figure 16:
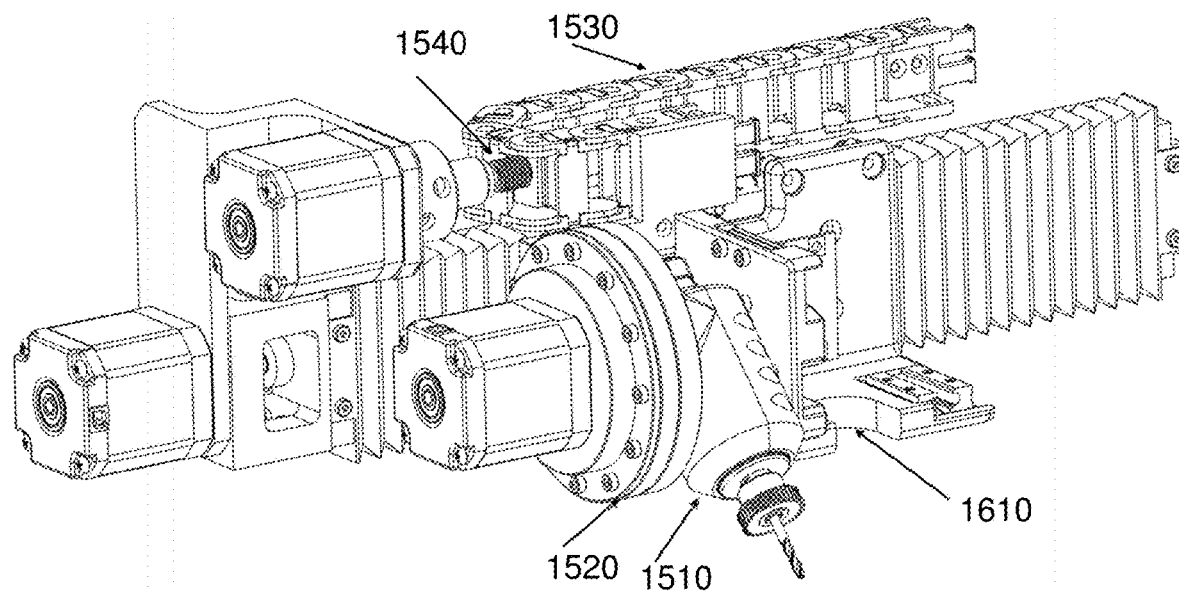
FIG. 16 shows another embodiment of the milling and head assembly.
Figure 17:
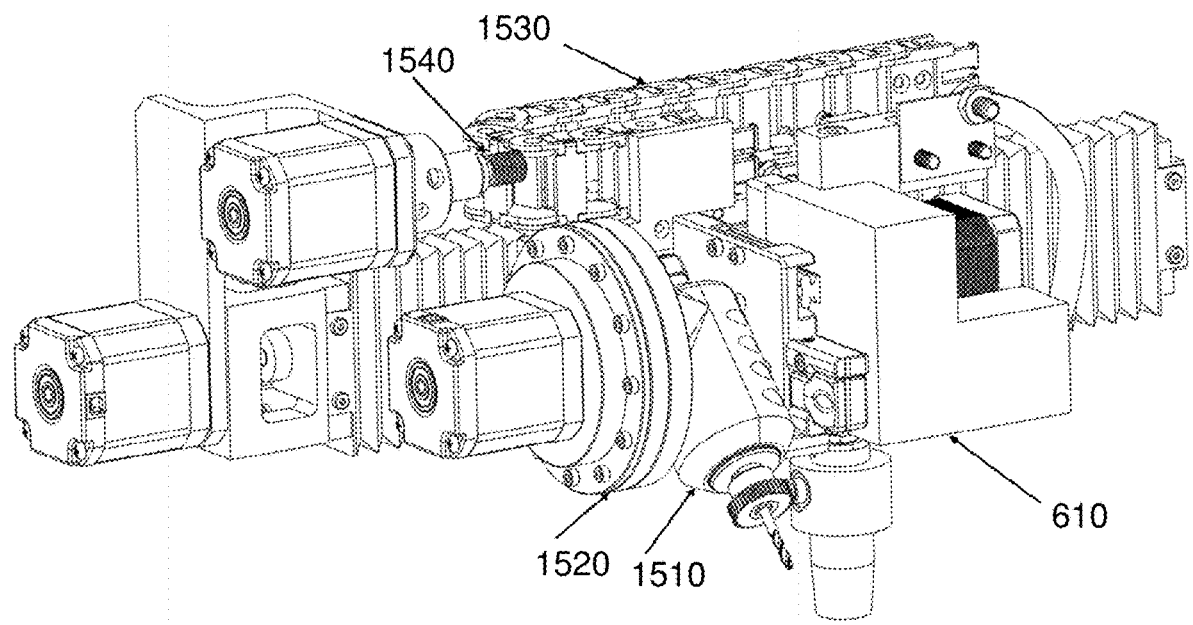
FIG. 17 shows another embodiment of the milling and head assembly.

FIGS. 15-17 show various embodiments of a milling and head assembly. In FIG. 15 the head assembly 360, 365 may be attached to a horizontal part of the traverse system 380. The milling and head assembly may have any of a polymer deposition head, metal deposition head, a milling tool, a welding head, etc. As shown, a milling spindle 1510 is shown. A strain-wave gear reducer 1520 is also disclosed. A device 1530 to move the head assembly and associated components is provided. The device may be belt driven, linear rail driven, or set up in a delta or polar (one or more components rotate) coordinate fashion. In one embodiment, it may be a drag chain. A collet compressor 1540 is also shown. Adjacent to the milling spindle 1510 is shown the polymer deposition head 620.

FIG. 16 shows another embodiment of the milling and head assembly. A deposition head is not installed in this embodiment. An additive head dock 1610 is shown instead, which is where the deposition head 610, 620 may be attached. Depending on the type of deposition, the deposition head 610, 620 is attached at the dock 1610.

To illustrate remarks made above regarding FIG. 16, FIG. 17 shows another embodiment of the milling and head assembly. As shown, a metal deposition device 610 is shown where the polymer deposition head is provided in FIG. 15.

Figure 18:
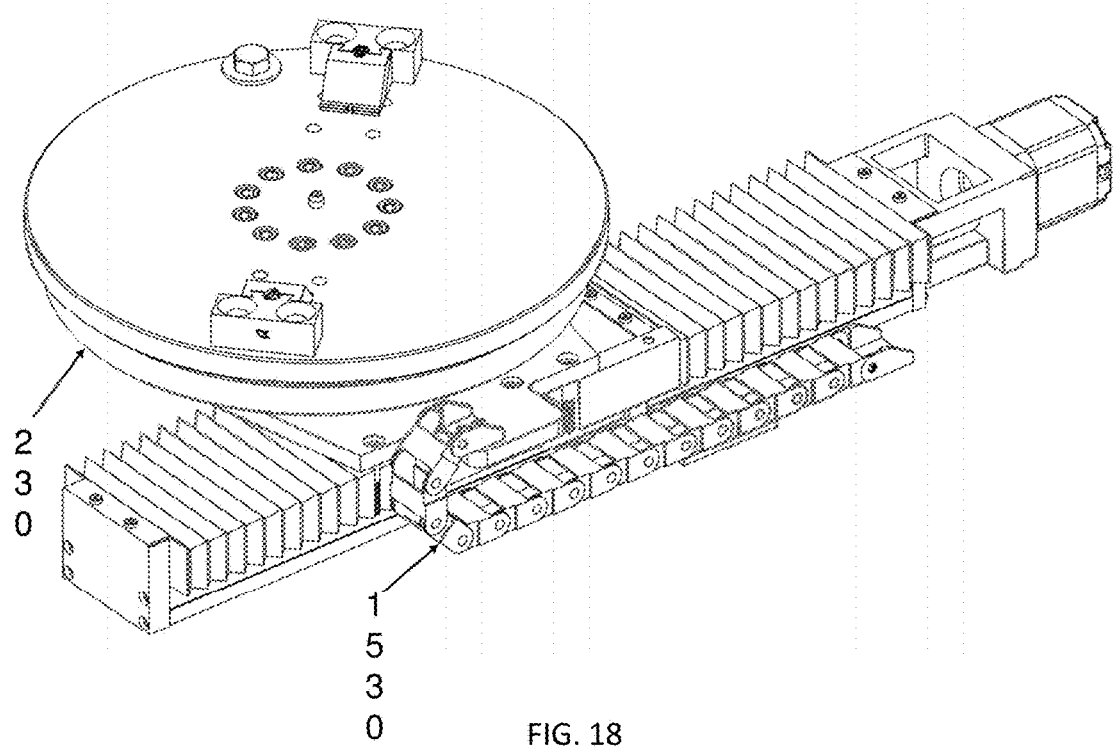
FIG. 18 shows the part of the traverse system to which the rotary bed is attached.

FIG. 18 shows the part of the traverse system to which the rotary bed is attached. As shown a traverse bracket 1810 upon which the rotary bed 230 is attached. The device 1530 to move the bed 230 is also provided. As discussed above, the device 1530 may be a drag chain.

Figure 19:
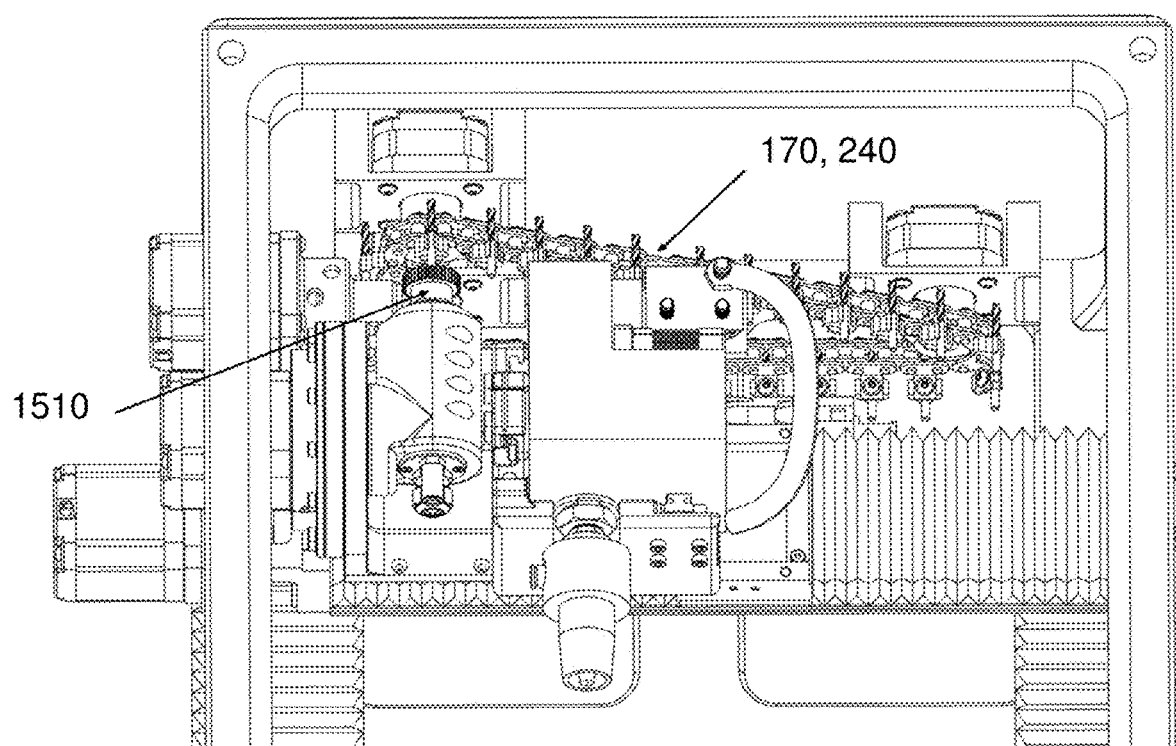
FIG. 19 shows an embodiment a tool being changed.

FIG. 19 shows an embodiment a tool being changed. As shown, the automatic tool carousel 170, 240 is shown. A machining spindle 1510 is shown where a part of the spindle fits within the tool holder 240 on the tool carousel 170.

Multiple subtractive manufacturing tools may be utilized in the embodiments disclosed herein. These tools may include, but are not limited to, milling, tapping, and routing bits, etc. Bits may be held on a chain driven selector however a rack can be used to store and select bits. Additionally, a traditional carousel changer or rigid straight line changer can be used.

Figure 20:
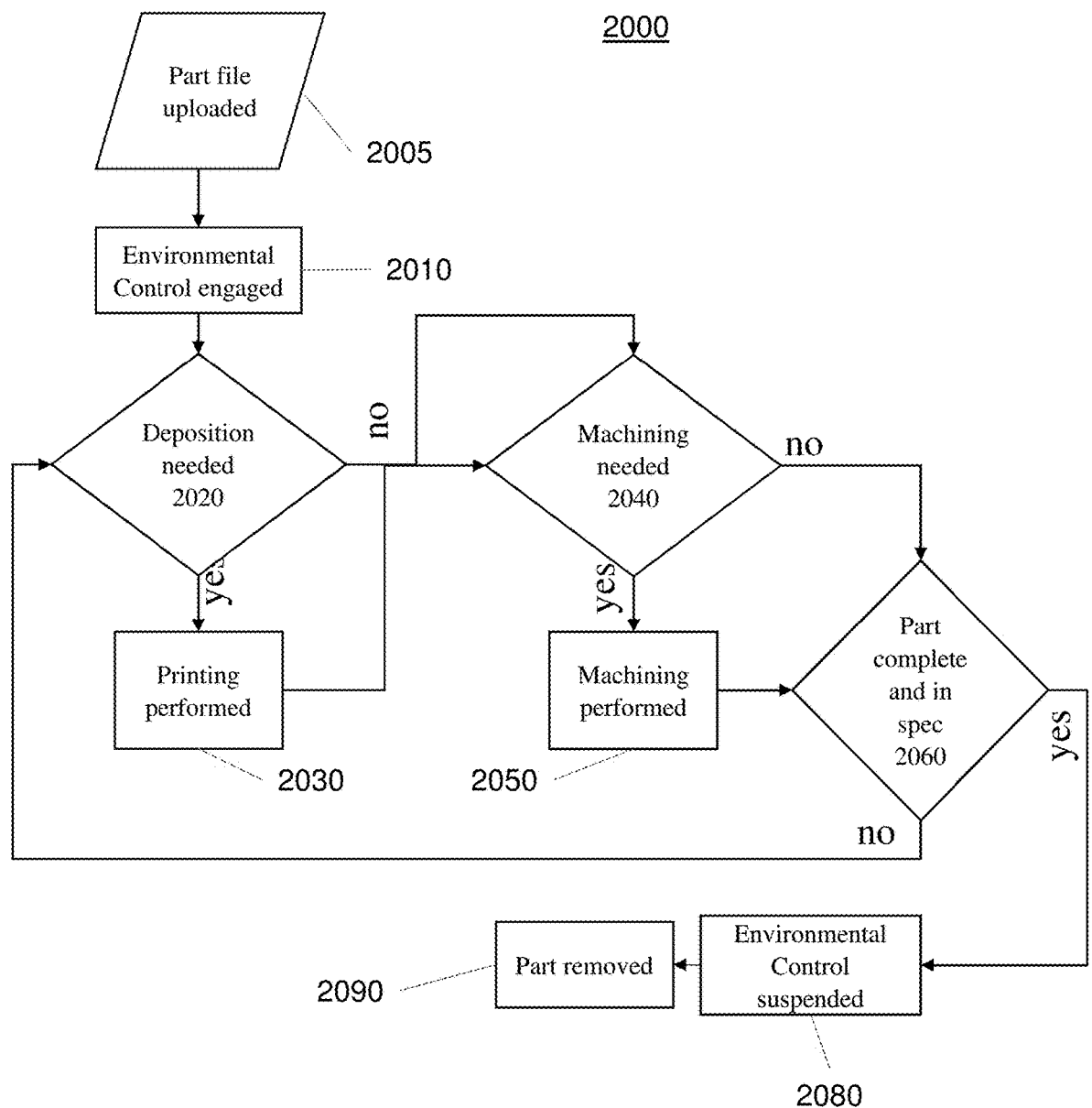
FIG. 20 shows a flowchart of an embodiment of a method.

FIG. 20 shows a flowchart of an embodiment of a method. A part file may be uploaded to the computing device 250. The method 2000 comprises activating the environmental control unit, at 2010. A determination whether a manufacturing deposition process is needed is made, at 2020. If the answer is yes, the additive manufacturing process is initiated, at 2030. If the answer is no, a determination whether machining of the part is needed, at 2040. If the answer is yes, the machining is performed, at 2050. Once the additive manufacturing processing is complete, and if the answer to machining is needed is no, at step 2040, the next determination is whether the part is complete and within the part specifications, at 2060.

If the part is not completed or if the specifications for the part are not met, the process begins again with first determining whether deposition is needed, at 2020. If the part is completed, the environmental control unit is turned off, at 2080, and the part is removed, at 2090. Removal may be performed manually or with the robotic arm 330.

Though a decision whether deposition is shown as occurring before determining whether to machine, these steps, and each's associated manufacturing steps may be interchanged. More specifically, determining whether machining is needed first and then performing the machining process, if needed, may occur prior to determining whether deposition is needed and performing the deposition process.

FIG. 21 show another flowchart of an embodiment of a method. The method 2100 comprises determining a part to be created with a part creation file provided to a computing device, at 2110. The method 2100 may comprise controlling an environment at a location where the part is to be created with an environmental control system, at 2120. The method further comprises determining whether to apply at least one of an additive manufacturing process with an additive manufacturing subsystem and to remove a piece from at least one of the part and a block of material used to create the part with a subtractive manufacturing subsystem and applying the process determined, at 2130. The method further comprises switching between at least one of a deposition head specific to the at least one of an additive manufacturing process when performed by the additive manufacturing subsystem and a tool when the subtractive manufacturing process is performed by the subtractive manufacturing subsystem, at 2140. The method may further comprise determining whether the part adheres to a specification requirement for the part with a part verification subsystem, at 2150. This may be done either during or after the part is created. If after part creation, the part may be further modified, improved, as disclosed herein until it is within the specification requirements.

Figure 22:
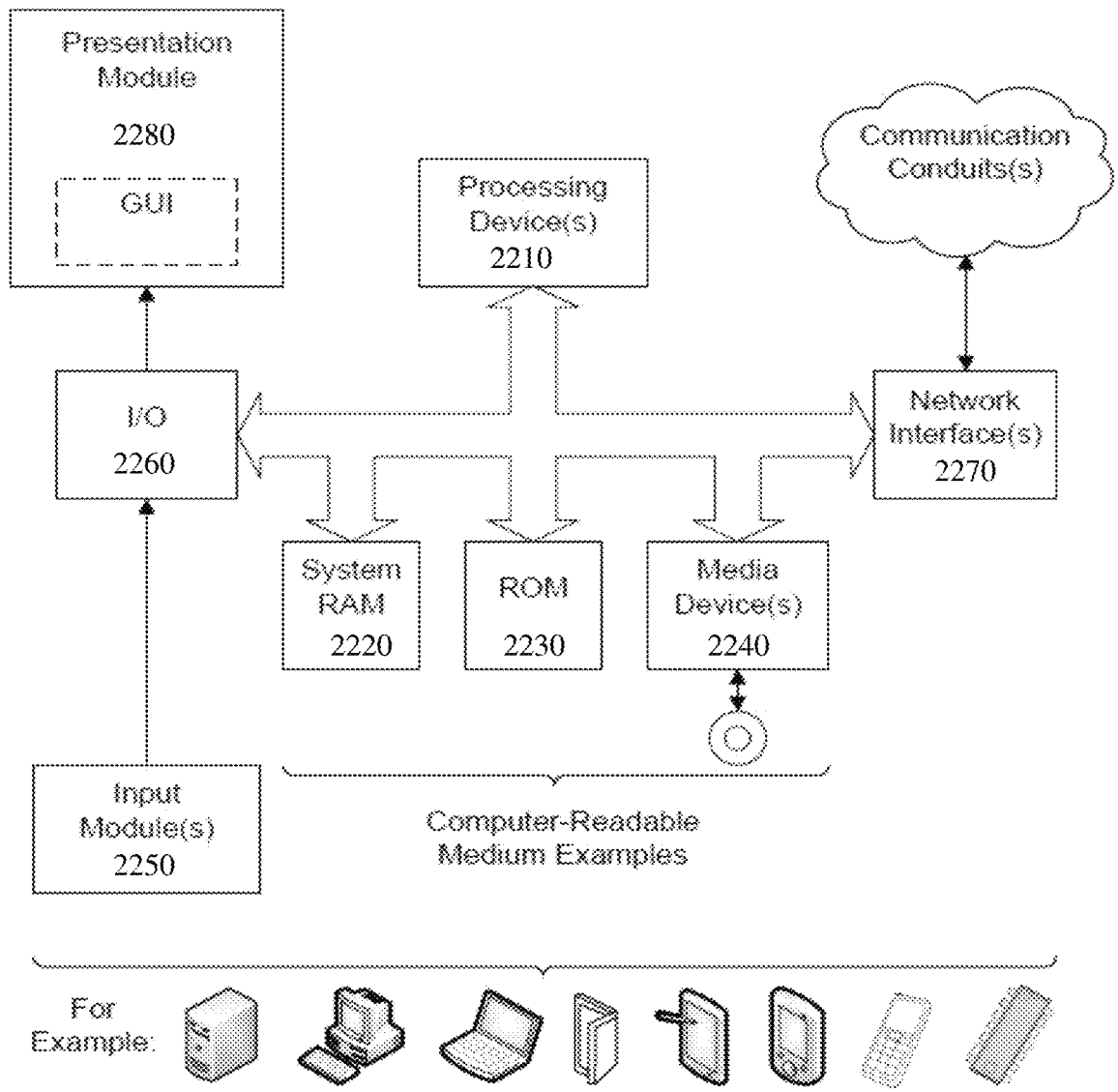
FIG. 22 shows an embodiment of a computing device.

Referring now to FIG. 22, in a basic configuration, a computing device, or subsystem, may include any type of stationary computing device or a mobile computing device. The computing device may be part of avionics/electronics. As disclosed above with respect to the method shown in FIG. 20, the computing device 250 may determine the manufacturing process, including determining whether to machine or apply deposition, how long to perform either function, movements of the rotary bed and movement of the traverse system when creating the part and capturing an image of a part to be recreated, converting the captured image into instructions to create the replacement part, etc.

The computing device may include one or more processors 2210 and system memory in a hard drive. Depending on the exact configuration and type of computing device, system memory may be volatile 2220 (such as RAM), non-volatile 2230 (such as read only memory (ROM), flash memory, and the like) or some combination of the two. A system memory may store an operating system, one or more applications, and may include program data for performing flight, navigation, avionics, power managements operations such as for space operations.

The computing device may carry out one or more blocks of a process and or the additive manufacturing processes described herein. The computing device may also have additional features or functionality. As a non-limiting example, the computing device may also include additional data storage devices 2240 (removable and/or non-removable) such as, for example, magnetic disks, optical disks, or tape. The computer storage media may include volatile and non-volatile, non-transitory, removable and non-removable media implemented in any method or technology for storage of data, such as computer readable instructions, data structures, program modules or other data. The system memory, removable storage and non-removable storage are all non-limiting examples of computer storage media. The computer storage media may include, but is not limited to, RAM, ROM, Electrically Erasable Read-Only Memory (EEPROM), flash memory or other memory technology, compact-disc-read-only memory (CD-ROM), digital versatile disks (DVD) or other optical storage, magnetic cassettes, magnetic tape, magnetic disk storage or other magnetic storage devices, or any other physical medium which can be used to store the desired data and which can be accessed by computing device. Any such computer storage media may be part of device.

The computing device may also include or have interfaces 2260 for input device(s) 2250 such as a keyboard, mouse, pen, voice input device, touch input device, etc. The computing device may include or have interfaces for connection to output device(s) 2280 such as a display, speakers, etc. The computing device may include a peripheral bus for connecting to peripherals. Computing device may contain communication connection(s) 2270 that allow the device to communicate with other computing devices, such as over a network or a wireless network. By way of example, and not limitation, communication connection(s) may include wired media such as a wired network or direct-wired connection, and wireless media such as acoustic, radio frequency (RF), infrared and other wireless media. The computing device may include a network interface card to connect (wired or wireless) to a network.

Computer program code for carrying out operations described above may be written in a variety of programming languages, including but not limited to a high-level programming language, such as C or C++, for development convenience. In addition, computer program code for carrying out operations of embodiments described herein may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed Digital Signal Processor (DSP) or microcontroller. A code in which a program of the embodiments is described can be included as a firmware in a RAM, a ROM and a flash memory. Otherwise, the code can be stored in a tangible computer-readable storage medium such as a magnetic tape, a flexible disc, a hard disc, a compact disc, a photo-magnetic disc, a digital versatile disc (DVD).

The embodiments may be configured for use in a computer or a data processing apparatus which includes a memory, such as a central processing unit (CPU), a RAM and a ROM as well as a storage medium such as a hard disc.

The "step-by-step process" for performing the claimed functions herein is a specific algorithm, and may be shown as a mathematical formula, in the text of the specification as prose, and/or in a flow chart. The instructions of the software program create a special purpose machine for carrying out the particular algorithm. Thus, in any means-plus-function claim herein in which the disclosed structure is a computer, or microprocessor, programmed to carry out an algorithm, the disclosed structure is not the general purpose computer, but rather the special purpose computer programmed to perform the disclosed algorithm.

A general purpose computer, or microprocessor, may be programmed to carry out the algorithm/steps for creating a new machine. The general purpose computer becomes a special purpose computer once it is programmed to perform particular functions pursuant to instructions from program software of the embodiments described herein. The instructions of the software program that carry out the algorithm/steps electrically change the general purpose computer by creating electrical paths within the device. These electrical paths create a special purpose machine for carrying out the particular algorithm/steps.

The embodiments disclosed herein may be used as a computer numeric control ("CNC") tool or system to determine whether manufacturing specifications, or specification requirement, are met for the part and to further machine the part to meet the manufacturing specifications. Thus, by utilizing the embodiments disclosed herein, the a manufacturing process may be automated where the part's mechanical dimensions may be defined using a computer aided drawing computer program where the resulting file is translated into manufacturing directives for embodiments disclosed herein perform. Since manufacturing of the part may require use of a number of different tools, such as disclosed herein, the embodiments disclosed herein may combine the multiple tools into a single manufacturing process performed by a single system 100.

The embodiments disclosed herein may enable production of metal parts, polymer parts and parts that contain both metal and polymer by implementing swappable deposition heads. Thus, embodiments may be arranged or optimized to support both thermoplastic extrusion and metal welding operations in a single machine or process. Where such manufacturing is performed in a limited area, such as, but not limited to in outer space, such as, but not limited to, aboard the International Space Station, a significant advancement in the manufacturing capabilities is possible with the embodiments disclosed herein as currently no method or system exists for production of metal parts in such environments or micro-gravity or varying gravity environments.

Thus, parts must be designed such that they can be manufactured in such harsh environments as outer space. Often because of the limitations of such environments, sacrifices in the design must be made. Complex internal structures become difficult to achieve when the starting material is solid stock which must be machined away from the exterior to generate the part. Furthermore, additive manufacturing followed by machining is generally only applicable to improving the surface finish of surfaces accessible from the exterior. Fully-enclosed, internal features are difficult or impossible to conduct finishing operations on. By incorporating additive, subtractive, and dimensional verification in a single machine, it becomes possible to machine internal surfaces to meet tolerances in the middle of the manufacturing process, rather than only being able to perform finishing operations at the end.

With an ability to verify that the tool or part meets a desired specification, the embodiments are able to produce and inspect finished polymer and metal parts with one device, eliminating the need for separate additive manufacturing, and subtractive machining, and inspection facilities. The embodiments disclosed herein accomplishes this by utilizing scanning techniques which can be used both to verify final metrology of a part and to detect errors as they occur during manufacturing. This error detection capability, which may be performed with the computing device disclosed herein in combination with the geometric part verification subsystem, allows for corrective action to be taken when needed during the manufacturing process so that the final part is produced defect-free.

Thus, an ability to manufacture plastic or polymer-based material with tighter tolerances is possible. An addition of metal material to a part, which also can be manufactured to tight tolerances, is also possible.

The embodiments disclosed herein may apply other additive manufacturing techniques or processes to produce parts or bulk materials, such as ingots before an subtractive process is utilized. Machining can be performed either lubricated or dried and assisting technologies such as grabbers, brushes, or pressurized gas can be used to free material from a surface. In an embodiment, freeing material from the surface may usually occur after machining to free chips common to machining processes.

A part manufactured with an embodiment disclosed herein may be removed from the build surface in a plurality of ways. In an embodiment, the build surface may become a portion or part of the end manufactured part, requiring no removal. Thus for each build, a new build surface 120 is first placed. In another embodiment, the part may be manufactured on or around a smaller bulk material piece which may be later machined into the finished part. In another embodiment, the part may be removed by cutting, whether by mechanical means such as, but not limited to, a saw or by higher energetic means such as, but not limited to, a laser or wire electrical discharge machining ("EDM"). In another embodiment water jetting may be used to dislodge the part. A sacrificial first layer or build tray may also be utilized and machined off. In yet another embodiment, a release layer, a layer in which does not bond well, may be utilized as a first layer. By doing so, the part may be pulled or knocked off upon completion. As disclosed above, a robotic arm 330 may be used to assist in any of these removal approaches.

Though not shown, bellows or other protective coverings may be used to protect the hardware within the enclosure 110 from debris that would contaminate or cause mechanical breakdown of the embodiments discussed herein. Thus, as a non-limiting example, the traverse assembly 380 may have a protective covering protecting it from debris that may be easily moved around within the enclosure 110, especially when in a micro-gravity environment. This debris which could be considered interference is more likely to occur in reduced gravity, such as, but not limited to micro-gravity, due to the lack of settling to a single directional surface.

Unless otherwise defined, all terms (including technical and scientific terms) used herein have the same meaning as commonly understood by one of ordinary skill in the art to which embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In particular, unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such data storage, transmission or display devices.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

The invention claimed is:

1. A system, the system comprising:
   a polymer-based additive manufacturing subsystem to create a part;
   a metallic-based additive manufacturing subsystem to create the part;
   a subtractive manufacturing subsystem to remove a piece from a material that is provided to create the part;
   a build area having a bed where the part is created, the bed movable in first and second linear horizontal directions and a circular direction about a center axis;
   a tool carousel to hold, store and exchange a plurality of deposition heads having a first deposition head used for the polymer-based additive manufacturing subsystem and a second deposition head used for the metallic-based additive manufacturing subsystem and a plurality of tools for the subtractive manufacturing subsystem;

an exchanger to switch and place the polymer-based additive manufacturing subsystem, the metallic-based additive manufacturing subsystem and the subtractive manufacturing subsystem into a position to create the part;

a milling and head assembly coupled to the exchanger and having a subtractive manufacturing tool holder for a respective subtractive manufacturing tool of the plurality of tools, selected from the tool carousel by the exchanger and a dock adjacent to the subtractive manufacturing tool holder, the dock to dock a respective deposition head of the plurality of deposition heads, selected from the tool carousel by the exchanger and wherein the dock is vertically and horizontally movable together with the tool holder to the build area by the exchanger;

a robotic arm to engage the part being made and to assist with removal of the piece from the material in response to the metallic-based additive manufacturing subsystem operating; and an environmental control unit to collect debris produced during operation of the polymer-based additive manufacturing subsystem and the metallic-based additive manufacturing subsystem.

2. The system according to claim 1, further comprising a part verification subsystem to confirm whether the part adheres to a specification requirement for the part.

3. The system according to claim 2, wherein the part verification subsystem determines whether a defect exists in the part.

4. The system according to claim 2, wherein the part verification subsystem comprises an imaging scanner to capture images of the part.

5. The system according to claim 1, wherein the tool carousel is mounted within an enclosure enclosing at least the build area, the exchanger, the milling and head assembly, the subtractive manufacturing subsystem, the polymer-based additive manufacturing subsystem and the metallic-based additive manufacturing subsystem; and the tool carousel is mounted above the milling and head assembly.

6. The system according to claim 5, wherein the exchanger is a traverse assembly to position and move the bed in the build area, the dock, and the tool holder.

7. The system according to claim 1, wherein the polymer-based additive manufacturing subsystem comprises the first deposition head to provide for thermoplastic deposition and a feedstock source that provides feedstock to the polymer-based additive manufacturing subsystem.

8. The system according to claim 1, wherein the metallic-based additive manufacturing subsystem comprises the second deposition head to provide for metal deposition and a feedstock source to provide a metallic feedstock for creation of the part.

9. The system according to claim 1, wherein the exchanger is a traverse assembly that includes:
vertical traverse brackets;
a first horizontal traverse bracket attached to the vertical traverse brackets and arranged to move up and down along the vertical traverse brackets wherein the tool holder and the dock are supported by the first horizontal traverse bracket;
a second horizontal traverse bracket attached to the bed and below the first horizontal traverse bracket; and
an attachment component coupled to the second horizontal traverse bracket and which moves the bed along the second horizontal traverse bracket orthogonal to the first horizontal traverse bracket and in the circular direction.

10. The system according to claim 1, wherein in the build area the exchanger includes:
a horizontal traverse bracket attached to the bed;
an attachment component coupled to the horizontal traverse bracket; and
a drag chain to move the attachment component.

11. A system, the system comprising:
an additive manufacturing subsystem to provide for deposition of at least one material of a polymer material and a metallic material during creation of a part;
a subtractive manufacturing subsystem to remove a piece from the at least one material to create the part;
a build area where the part is created and/or connected to the build area causing the build area to become a portion of the part, the build area including a bed movable in first and second horizontal directions and a circular direction about a center axis;
an exchanger including a tool carousel to hold, store and exchange a plurality of deposition heads and a plurality of subtractive manufacturing tools;
a milling and head assembly coupled to the exchanger and having a subtractive manufacturing tool holder and a dock adjacent to the subtractive manufacturing tool holder, the dock is vertically and horizontally movable to the build area by the exchanger and docks and locates one deposition head of the plurality of deposition heads, selected from the tool carousel by the exchanger, specific to the at least one material of the additive manufacturing subsystem during creation of the part, and the tool holder is vertically and horizontally movable to the build area by the exchanger together with the dock and the one deposition head to locate and hold one subtractive manufacturing tool of the plurality of subtractive manufacturing tools, selected from the tool carousel by the exchanger, used for removing the piece from the at least one material from which the part is created;
and a part verification subsystem to determine whether the part adheres to a specification requirement for the part.

12. The system according to claim 11, further comprising:
an enclosure; and
an environmental control unit to collect debris produced during operation of at least one of the additive manufacturing subsystem and the subtractive manufacturing subsystem,
wherein the tool carousel is mounted above the milling and head assembly within and to the enclosure.

13. The system according to claim 11, wherein the part verification subsystem comprises an imaging scanner to capture images of the part.

14. The system according to claim 11, wherein the tool carousel comprises tool holders, each of the tool holders of the tool carousel holds and exchanges one deposition head of the plurality of deposition heads specific to a type of additive manufacturing process being performed by the additive manufacturing subsystem, or one subtractive manufacturing tool of the plurality of subtractive manufacturing tools, specific to remove the piece from at least one of the part being created and the material from which the part is created during a subtractive manufacturing process of the subtractive manufacturing subsystem.

15. The system according to claim 11, further comprising a plurality of feedstock sources that provide feedstock to the additive manufacturing subsystem based on a type of deposition being performed.

16. The system according to claim 11, wherein the exchanger is a traverse assembly to position and move the dock, the tool holder, and the bed in the build area.

17. The system according to claim 16, wherein the traverse assembly includes:

vertical traverse brackets;

a first horizontal traverse bracket attached to the vertical traverse brackets and arranged to move up and down along the vertical traverse brackets wherein the tool holder and the dock are supported by the first horizontal traverse bracket;

a second horizontal traverse bracket attached to the bed and below the first horizontal traverse bracket; and an attachment component coupled to the second horizontal traverse bracket and which moves the bed along the second horizontal traverse bracket and in the circular direction.

18. The system according to claim 11, further comprising a computing subsystem to analyze data from the part verification subsystem and to operate at least one of the additive manufacturing subsystem and the subtractive manufacturing subsystem to at least one of modify the part to be within a specification of the part and to repair a defect detected in the part.

19. The system according to claim 11, wherein the additive manufacturing subsystem is a metallic-based additive manufacturing subsystem; and further comprising a robotic arm to engage the part being made to assist with removal of the piece from the metallic material in response to an operation of the metallic-based additive manufacturing subsystem.

* * * * *